(12) United States Patent
Edholm

(10) Patent No.: US 6,600,721 B2
(45) Date of Patent: *Jul. 29, 2003

(54) END NODE PACING FOR QOS AND BANDWIDTH MANAGEMENT

(75) Inventor: Phil Edholm, Fremont, CA (US)

(73) Assignee: Nortel Networks Limited, St. Laurent (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/224,588

(22) Filed: Dec. 31, 1998

(65) Prior Publication Data
US 2003/0067940 A1 Apr. 10, 2003

(51) Int. Cl.[7] ................ H04L 12/56; H04L 12/26; G06F 3/14
(52) U.S. Cl. ............... 370/232; 370/235; 370/349; 709/203
(58) Field of Search ............... 370/229, 230, 370/231, 232, 233, 234, 235, 236, 349, 447; 709/104, 203, 234

(56) References Cited

U.S. PATENT DOCUMENTS

| 5,936,940 A | * | 8/1999 | Marin et al. ............... 370/232 |
| 5,995,488 A | * | 11/1999 | Kalkunte et al. ............ 370/232 |
| 6,105,064 A | * | 8/2000 | Davis et al. ............... 709/224 |
| 6,118,787 A | * | 9/2000 | Kalkunte et al. ......... 340/825.5 |
| 6,173,325 B1 | * | 1/2001 | Kukreja ..................... 709/223 |

* cited by examiner

Primary Examiner—Hassan Kizou
Assistant Examiner—Ahmed Elallam
(74) Attorney, Agent, or Firm—Blakely Sokoloff Taylor & Zafman LLP

(57) ABSTRACT

A system of pacing data between a network and an end node is described. The system determines a threshold bandwidth based on the receiving capabilities of a client device. A control circuit monitors the flow of data and adjusts latencies between packets of data to stay within the threshold bandwidth. By maintaining the flow of data within the threshold bandwidth, the need for flow control signals and large buffers is minimized.

20 Claims, 8 Drawing Sheets

END NODE PACING FOR QOS AND BANDWIDTH MANAGEMENT

BACKGROUND OF THE INVENTION

1. Field of the Invention

The present invention relates generally to transferring information through a network. More particularly, the present invention relates to pacing information between end nodes and a network.

2. Description of Related Art

Modern network devices transfer information using a protocol such as an ethernet or an asynchronous transfer mode (ATM) protocol. A network transfers information from a first end or source of information, e.g. a server or an end node, to a second end or destination e.g.la second server or second end node. In recent years, it has become common to use giga-switches to couple large numbers of end nodes to a bank of servers. Many of these end nodes are coupled to the giga-switch through multiplexers.

Using multiplexers to couple end nodes to a giga-switch results in significant fluctuations in the quantity of data transferred between the switch and the end node. For example, when multiple workstations serving as end nodes simultaneously uplink information, the uplink may be overloaded. Thus, large buffers are used to store data that may be suddenly uploaded to avoid overloading the uplink.

At an opposite end, information is downloaded from the switch to the end node. The data flow from the switch through the multiplexer to the end node may be significantly higher than the end node can handle at a particular point in time. Thus, the network also includes a buffer to buffer received packets of data for transfer to the end node.

One method of "throttling data" or controlling data flow to the client device uses in-band flow control. Flow control uses the transmission of flow control, data "on" and data "off" signals to switch off data flow from a source device. The transmission of on and off signals to a receiving device such as an end node, requires additional control circuitry, and is inefficient because it uses buffers to temporarily store data in the network while the off signal stops the flow of data until data within the buffer is consumed.

The large buffers used to cache data flow between transmission of flow control signals uses significant hardware resources and increases the complexity and expense of the network system. Thus, a method of transferring data through a network using smaller buffers is desirable.

SUMMARY OF THE INVENTION

A method and apparatus for pacing packets of data for transfer through a network is described. Prior to transmitting the data, a bandwidth is negotiated between an end node and the network or a policy manager. The negotiated bandwidth determines the transmission rate of packets between the switch and the end node. Packet transmissions are scheduled according to the negotiated transmission rate. In one embodiment of the invention, the system adjusts the latency between packets to conform to the negotiated bandwidth.

BRIEF DESCRIPTION OF THE DRAWINGS

The advantage of the present invention will become more readily apparent to those skilled in the art after reviewing the following detailed description and accompanied drawings wherein.

DETAILED DESCRIPTION

The following invention describes a method and apparatus for pacing data to manage bandwidth in a network system. In the following invention, a number of details will be provided. For example, the following detailed description will describe the system as implemented in a local area network (LAN) or in an Ethernet and will describe a Microsoft socket for implementing the end node pacing. However, such details are designed to facilitate understanding of the invention and should not be interpreted to limit the invention as other variations of the invention may be obvious to one of ordinary skill in the art.

Figure 1:
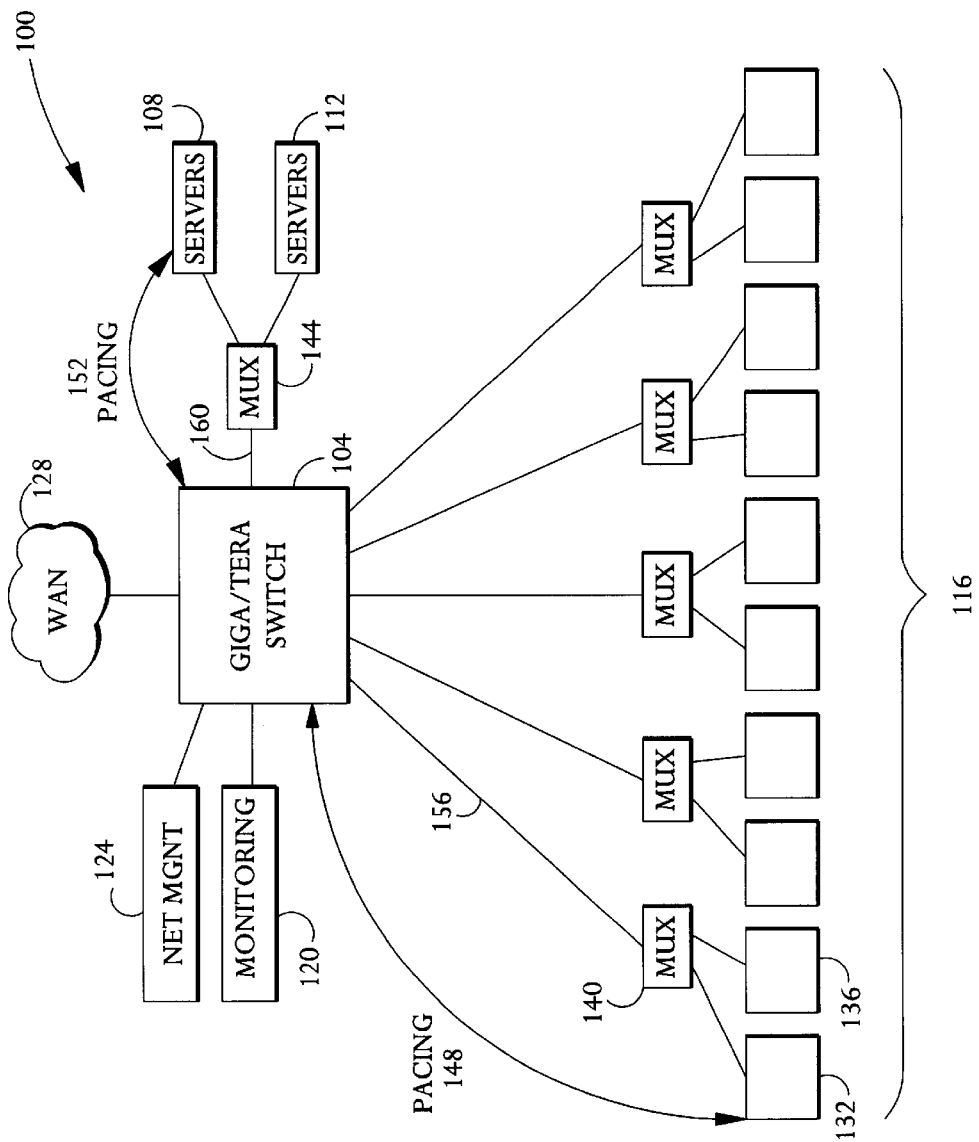
FIG. 1 illustrates a plurality of end nodes coupled to a switch as implemented in one embodiment of the invention.

FIG. 1 illustrates a local area network (LAN) system 100 which uses a giga-switch 104 to couple servers 108, 112 to a plurality of end nodes 116. Monitoring software 120 monitors operation of LAN system 100. Network management software 124 manages and controls operations of the switching system. In one embodiment of the invention, the LAN system 100 may be coupled to a wide area network (WAN) 128 such as an internet system.

In the illustrated embodiment, giga-switch 104 is coupled to each end node such as end nodes 132, 136 through a corresponding multiplexer such as multiplexer 140. A second multiplexer 144 may be used to couple giga-switch 104 to servers 108, 112. Using multiplexers to couple end nodes and servers to giga-switch 104 supports centralization of data traffic, creates low cost fiber uplinks, and allows the use of low cost multiplexers which do not require processing intelligence and memory to create a system with a specified QoS (quality of service) that is easily scaleable. Thus, the illustrated system of FIG. 1 provides a low cost method of implementing a LAN system 100.

The multiple links to giga-switch 104, the different data transfer rates which may occur between end nodes and giga-switch 104, and between servers and giga-switch 104 results in the use of large buffer systems. In order to minimize the buffer requirements, one embodiment of the invention paces data transfers between end node elements. Pacing arrow 148 indicates pacing of data between giga-switch 104 and end node 132 while pacing arrow 152 indicates pacing between server 108 and giga-switch 104.

The pacing of data may be defined by several factors. The first factor is the bandwidth that network 100 can handle. The network limitations are usually determined by the speed of giga-switch 104 and the capacity of interconnect lines such as line 156 coupling multiplexer 140 to giga-switch 104 and line 160 coupling multiplexer 144 to giga-switch 104. A second factor in determining the pacing speed is the capability of a receiving device such as end node 132 to receive and process data. In a pacing system, the output of packets from a server such as server 104 is designed to match the receipt capabilities of the end node such as end node 132. Matching the speed of transmission to the capabilities of end node 132 minimizes buffers needed to store the packets being transferred.

In one embodiment of the invention, pacing is implemented at a socket in a server 108. The sockets define individual ports to which data will be output. Thus, server 108 may query the network to determine the bandwidth capability of a particular port, particularly how fast a particular port can receive data. When a port cannot receive data at a particular speed, the flow of data into the network is reduced. Reduced data flow or decreased transmission rates may be achieved by increasing the latency time between data packets. In an alternate embodiment of the invention, a receiving device such as end node 132, sometimes called a "client device" may be used to pace data.

Pacing "premeters" the data transferred and thus does not use flow control signals to turn a flow of data "on" and "off". In a client based pacing system, the receiving device defines a predetermined bandwidth and maintains the transmission at the transmitting device to remain within the predetermined bandwidth thereby minimizing the complicated managing of buffers used by an on and off transmission of flow control signals.

Figure 2:
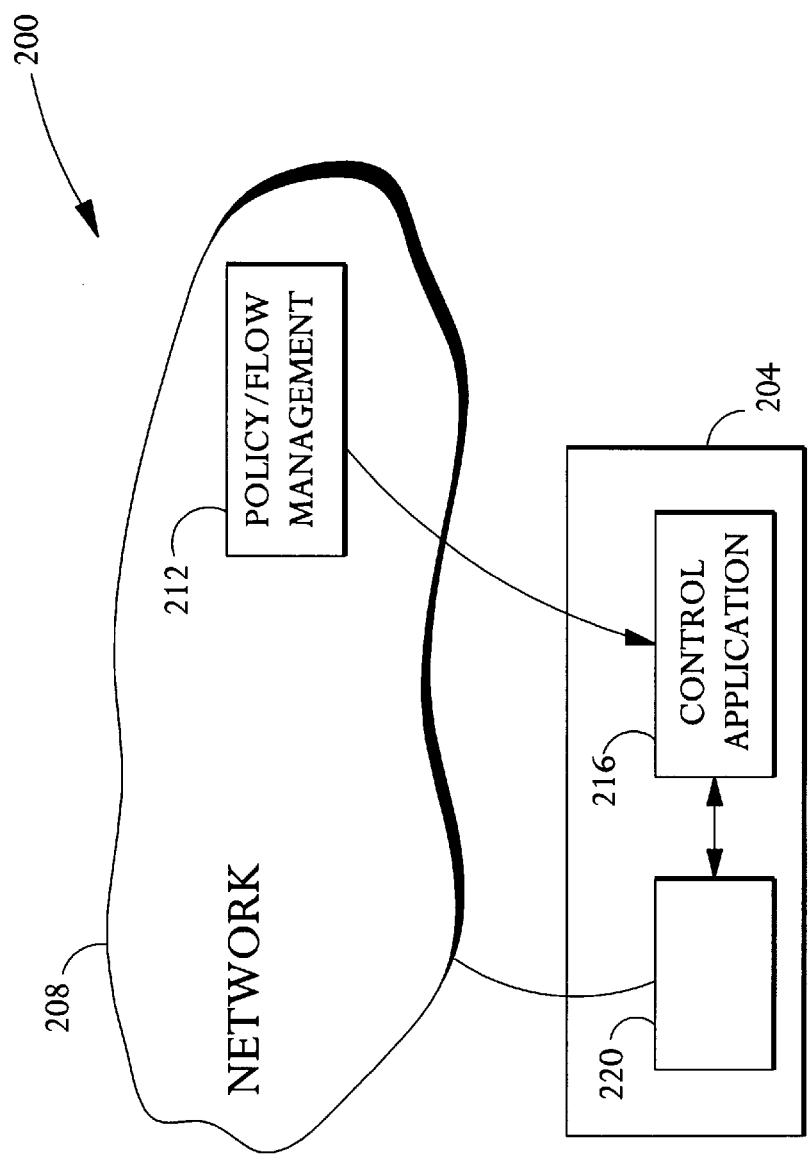
FIG. 2 illustrates interactions between an end node and a network in an end node or client controlled pacing system.

FIG. 2 illustrates a system 200 to pace data transferred between an end node such as client computer 204 and a network 208. In the illustrated embodiment, a policy or flow management device 212 of network 208 communicates with a control application 216 of client machine 204 to negotiate a bandwidth for data transfer between network 208 and client machine. 204. When a bandwidth is determined, control application 216 controls a pacing system 220 to maintain a data flow within the allocated bandwidth.

Figure 3:
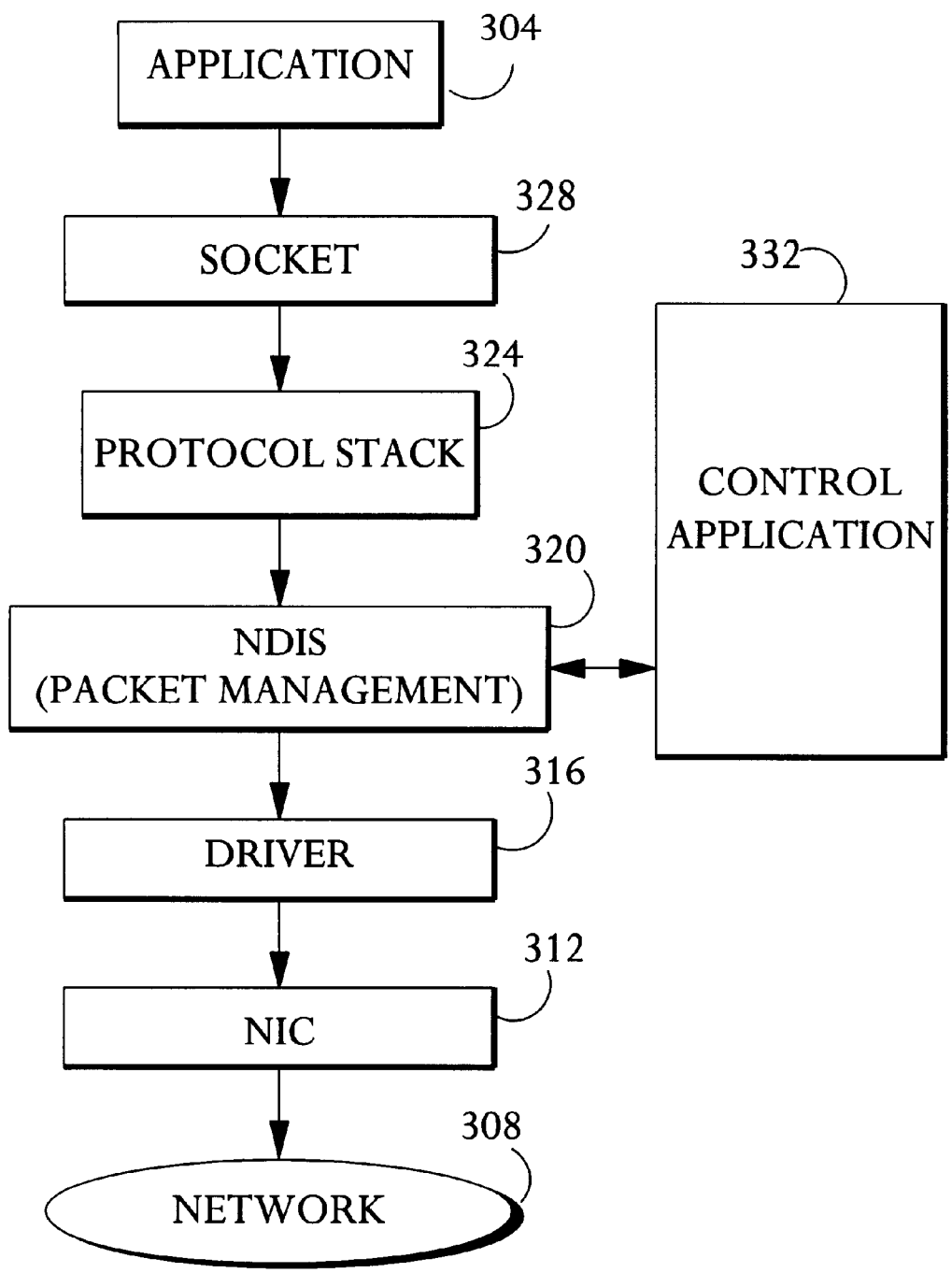
FIG. 3 illustrates implementing in the receiving device a system to pace data transmissions from a source to the receiving device.

A number of methods may be used to implement the pacing of data from the transmitting device to a receiving device. FIG. 3 illustrates one implementation of a system to pace data transmissions from a data transmission application 304 to a network 308. Network 308 receives data from a network interface card (NIC) 312 which interfaces with a driver 316. Driver 316 communicates with a network device interface standard protocol (NDIS) 320. A protocol stack such as TCP/IP (transmission control protocol/internet protocol) stack 324 resides on the NDIS layer 320.

When an application or transmission device 304 needs to send data, the transmission device generates a socket 328. Transmission device 304 transmits data to socket 328. Socket 328 transmits data to the TCP/IP stack 324 in a specific stream of a session level connection. Use of sockets such as socket 328 and NDIS protocols 320 allows the use of different applications with a TCP/IP stack 324. One popular socket is the Microsoft win-sock from Microsoft Corporation of Redmond, Wash.

One method of implementing client pacing (pacing controlled at the end client node) is by implementing a pacing process at the NDIS 320 level of the receiving device. When an application places a block of data in a transmit queue, a pointer is sent across the socket interface to TCP/IP stack 324 to allow TCP/IP stack 324 to copy the information. When a packet is to be transmitted from the protocol stack, the protocol stack assembles the packet, transfers the packet to a memory buffer and sets a pointer in the NDIS stack indicating the memory location stonng the packet. Driver 316 reads the pointer in the NDIS stack and when memory space is available on the NIC card 312, the data packet is read from memory to the NIC card.

In order to implement pacing of the flow of data at the NDIS level, a control application 332 monitors when protocol stack 324 transfers a packet to the memory buffer or queue for transmission. In one embodiment, control application may be implemented as software. When control application 332 determines that the bandwidth limitations of the transmission rate have not been exceeded, the control application 332 releases the pointer to driver 316. When the bandwidth limitations have been exceeded, the control application waits before placing the data packet on the transmit queue for driver 316. Thus the bandwidth limitations determine the latency between data packets. Higher bandwidth limit results in higher data transmission rates thereby reducing the latencies between data packets. Lower bandwidth limits result in lower data transmission rates and an increase in latencies between data packets. By implementing the transmission protocol at the NDIS level 320, the pacing of data can be implemented as third party software or as stackware from Microsoft.

Figure 4:
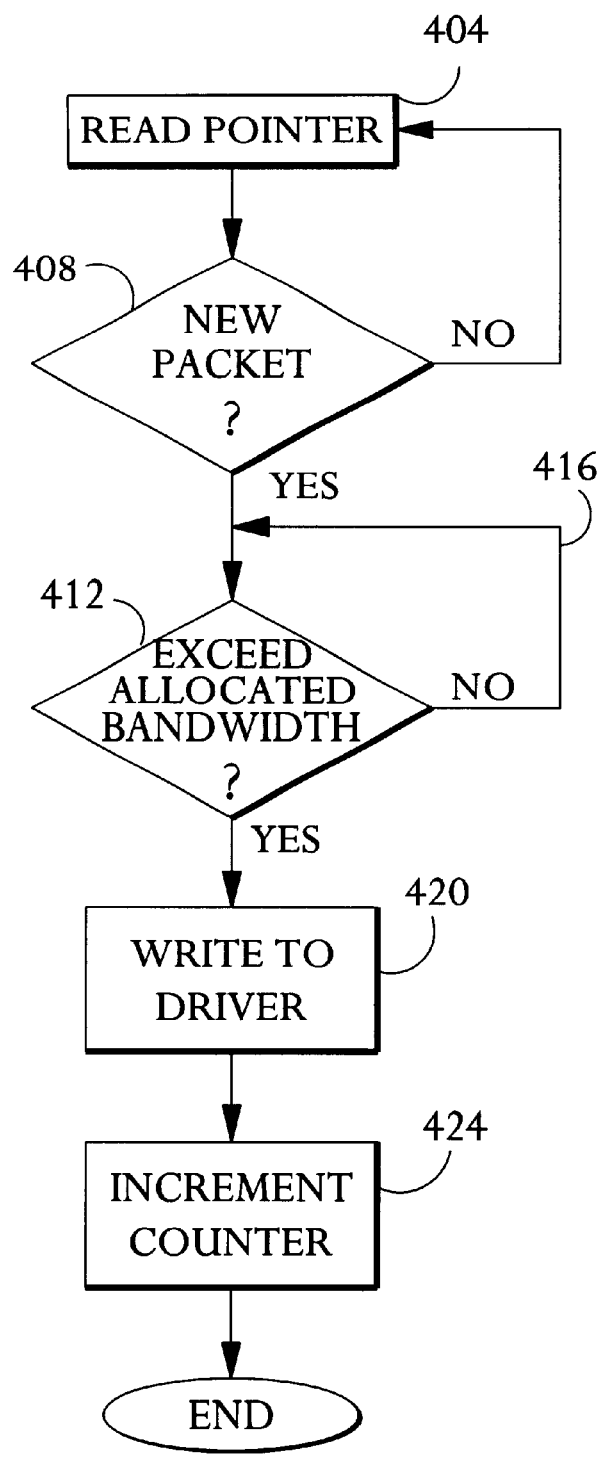
FIG. 4 is a flow diagram illustrating procedures used by a control application to pace data in one embodiment of the invention.

FIG. 4 is a flow diagram illustrating processing by a control application 332. In block 404, control application 332 reads a pointer. In one embodiment, the pointer is a pointer in the NDIS stack. The control application 332 determines when a new packet has been received in block 408 by detecting when the pointer has been incremented. As long as no new data is detected, the control application 332 continues to monitor the pointer in block 404, When new data is received in block 408, the control application 332 determines whether transmission of the packet to a destination port will cause a transmission rate of packets to the destination port to exceed an allocated bandwidth in block 412. Example procedures for determining whether transmitting the packet will result in exceeding the allocated bandwidth is described in detail in FIGS. 5 and 6. When in block 412, it is determined that transmitting the packet will exceed the allocated bandwidth, the system enters a wait loop 416 and does not transmit the packet. The system remains in wait loop 416 until the a time at which control application 332 determines in block 412 that transmitting the packet will not exceed the allocated bandwidth. When the control circuit determines that transmitting the packet will not exceed the allocated bandwidth, the packet is written to the driver in block 420 and a packet bit counter is incremented in block 424.

Figure 5:
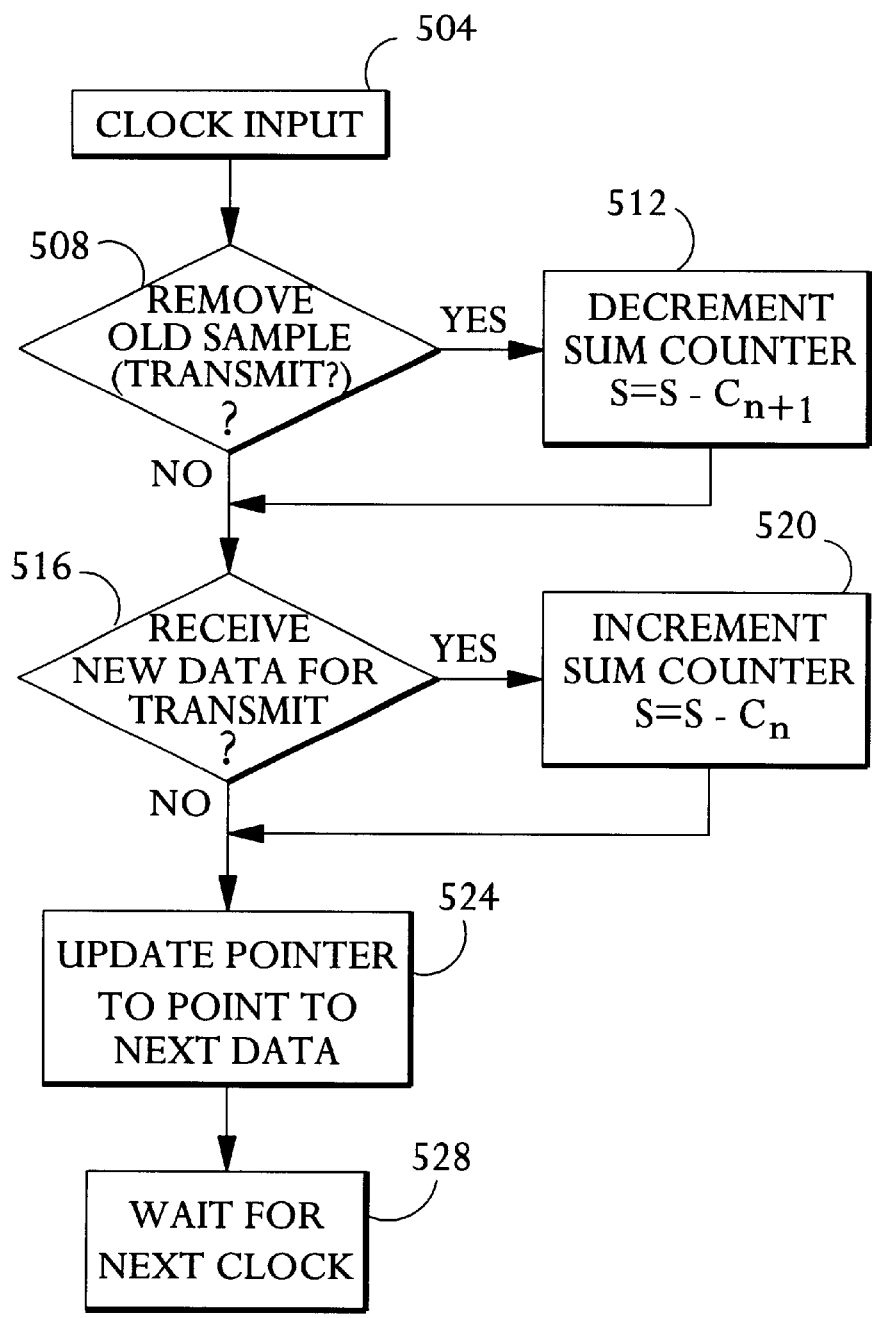
FIG. 5 is a flow diagram illustrating the maintenance of a pointer in one embodiment of the invention.

FIG. 5 is in flow diagram indicating maintenance of a pointer. The flow chart 500 begins upon reception of a clock signal or the beginning of a new time slot in block 504. A time slot is defined as a unit of time allocated to transfer a predetermined unit of data. A burst window is made up of a number of slots. Thus, for example, a time slot allocated to transfer a byte of data may be defined as one hundredth of a second. A burst window may for example include ten time slots for a burst window of one tenth of a second. In one embodiment of the invention, the control application monitors the total data transferred in a burst window to control a rate of data flow. In protocols such as ATM which utilize standard packet sizes, counting the number of packets in a burst window may be sufficient to determine a data flow. In alternate embodiments the control application may also measure data packet sizes to maintain the total data transfer rate remains within the alloted bandwidth.

Slot sizes and burst window sizes may be altered to accommodate different system requirements. For example, increasing the size of a burst window and decreasing slot sizes reduces the monitoring requirements of control application 332 reducing the need for interrupts in an interrupt system. However increased burst window size and decreased slot size increases the irregularity of data flow such that latencies between data packets at the beginning of a burst window are much smaller than latencies between data packets at the end of the burst window. Thus increasing burst window size and reducing time slot size may result in a substantial percentage of the data in a burst window being transmitted at the beginning of the burst window.

In block 508, when a packet, typically the oldest packet of data, is removed from the stack, a summation number indicating the number of elements awaiting transfer in a burst window is decremented in box 512. When in block 516, the system determines that data has been received for transfer, the summation number indicating the number of elements to be transmitted in a current burst window is incremented in block 520. In block 524, the pointer is updated to point to the new data to be transmitted. In block 528, the system waits for the next clock cycle.

Figure 6:
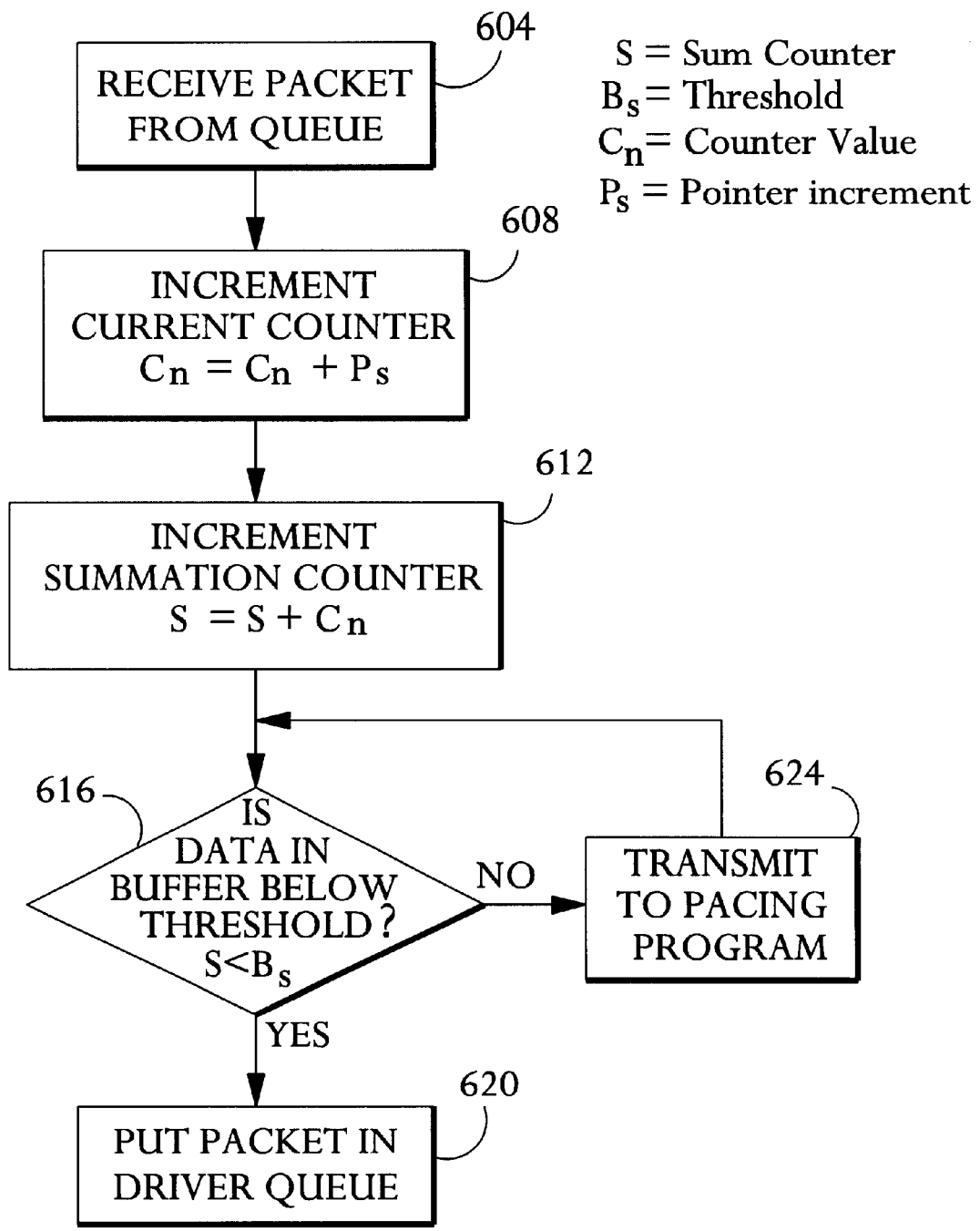
FIG. 6 is a flow diagram illustrating one example of a procedure by which a control application determines whether transmission of a packet to a destination port will cause a transmission rate of packets to the destination port to exceed an allocated bandwidth.

FIG. 6 is a flow diagram illustrating one example of a procedure by which control application 332 determines whether transmission of the packet to a destination port will cause a transmission rate of packets to the destination port to exceed an allocated bandwidth. In FIG. 6, a packet arrives from a queue in block 604. A counter is incremented in block 608 to monitor the increase in the number of units of data to be transferred. In block 612, a summation counter is incremented to reflect the increase in the total number of data units to be transferred in a burst window. When in block 616, it is determined that transmitting the total number of data units in a burst window is below a threshold transmit bandwidth, the data packet is placed on a driver queue in block 620. When it is determined in block 616 that transmission of the packet will result in the total number of data units in a burst window exceeding the threshold transmit bandwidth, a message is transmitted to the control program in block 624 to increase latency times between packets and the packet stored for transfer in a subsequent burst.

Figure 7:
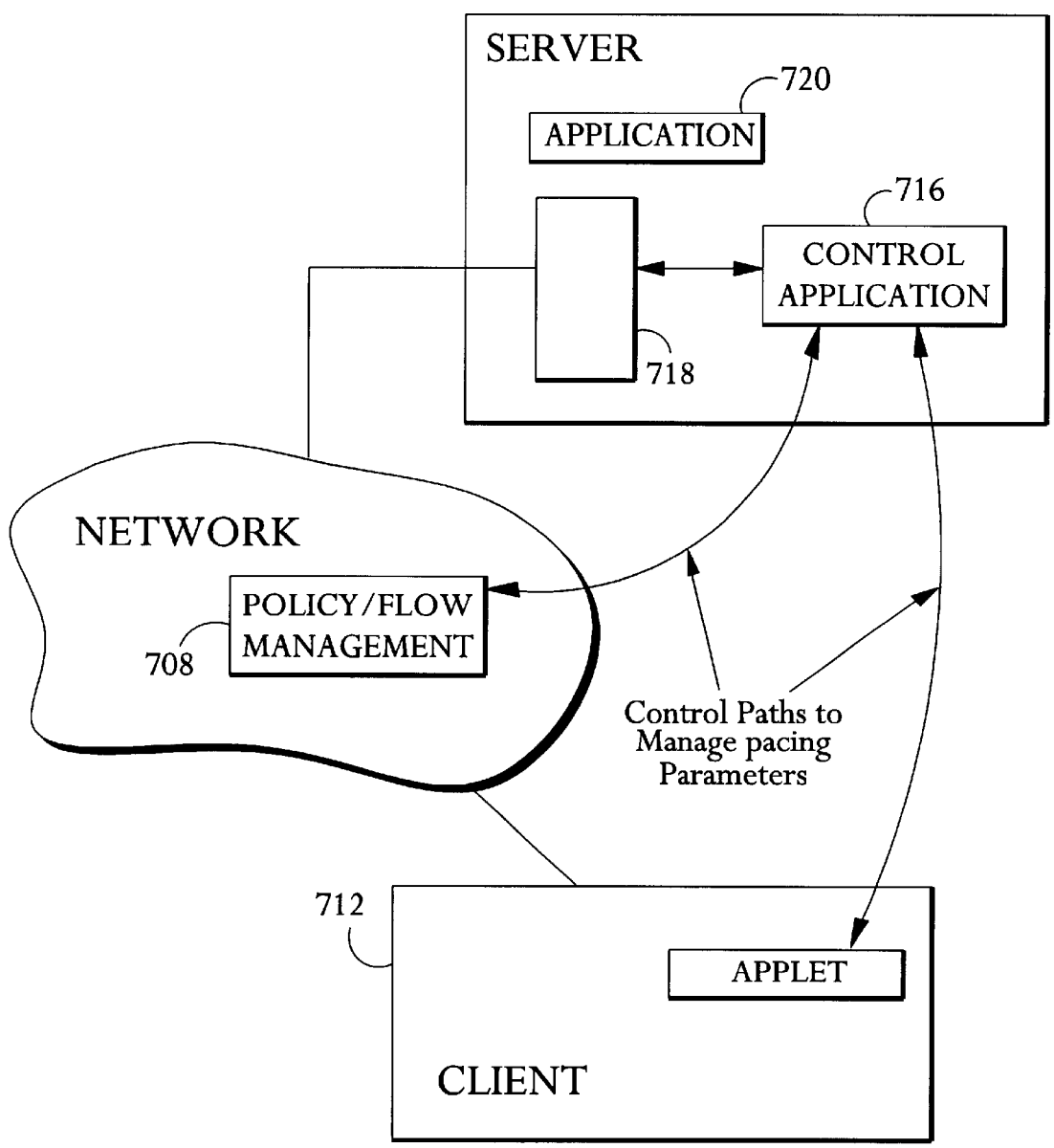
FIG. 7 illustrates interactions between a server, a network and a client in one example of pacing controlled at a transmission point.

In the described embodiments, a method for pacing data flow at a client has been described. In an alternate embodiment, the pacing may be implemented at a transmission point such as at a server. When pacing is implemented at the server, the server tracks the capabilities of the receiving unit on a protocol port to port or socket basis to account for the capabilities of the end node device coupled to each receiving port. In such an embodiment, the server determines the capabilities of a device coupled to a port. The server monitors the capabilities of the individual ports before transferring data to a port protocol stack FIG. 7 illustrates interactions between a server 704, a network 708 and a client 712 in one example of pacing controlled at a transmission point. In the illustrated embodiment, a policy management flow system within network 708 communicates the network data handling capabilities of network 708 while an application running within client 712 communicates client capabilities to a control application 716 in server 704. The control application 716 uses the received capabilities to negotiate an allocated bandwidth for data transmission. The allocated bandwidth is used to control a pacing system 718 in server 704 to pace data output by application 720.

Figure 8:
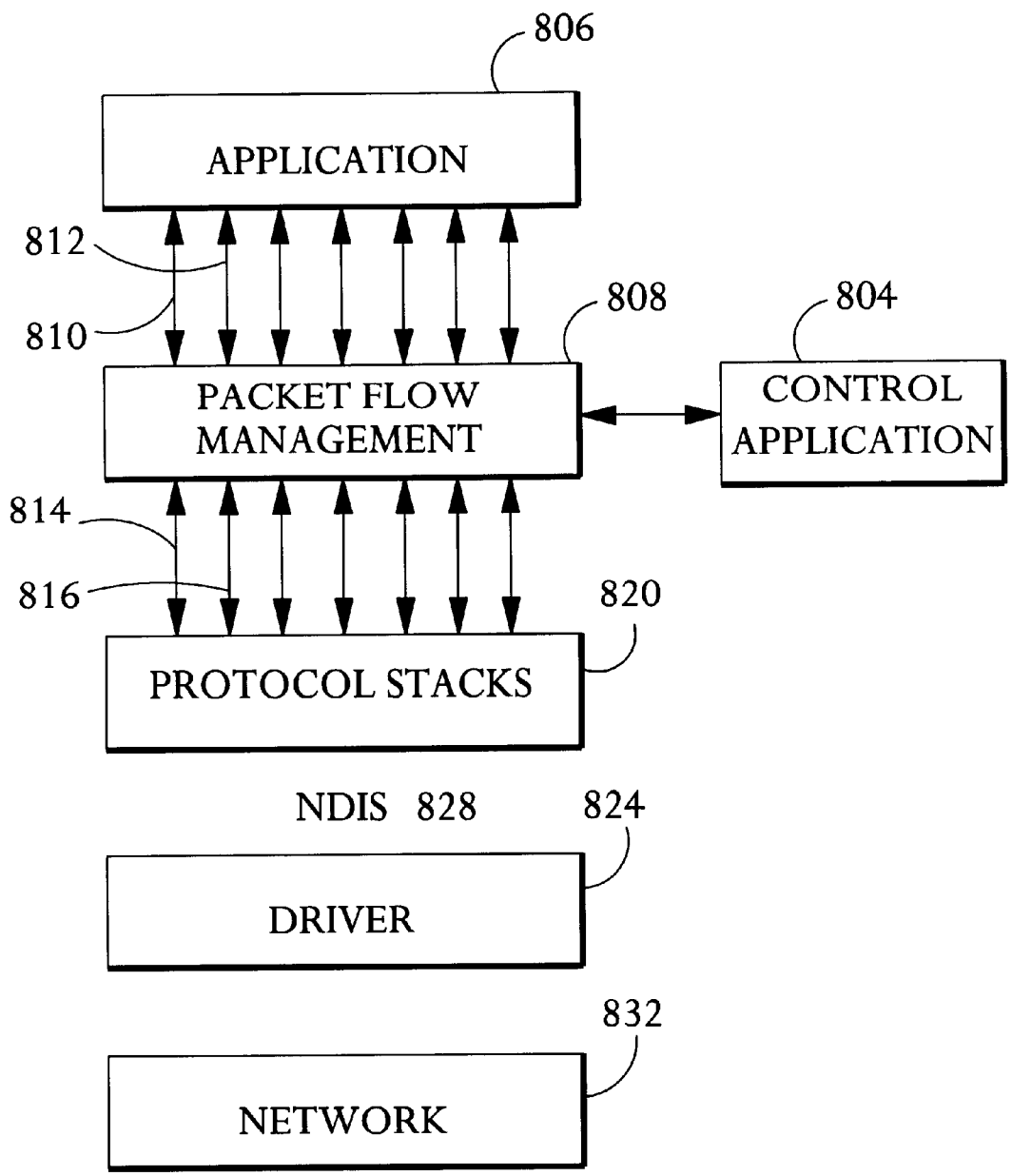
FIG. 8 illustrates implementing in the source device a system to pace data transmissions from the source to a receiving device.

FIG. 8 illustrates one implementation of a server pacing system using an architecture similar to that used in client pacing systems. In the illustrated embodiment, a control application 804 controls data flow through each socket 810, 812 interconnecting an application 806 to a packet flow management 808 system. Control application 806 also controls data flow through sockets 814, 816 connecting packet flow management 808 system to protocol stacks 820 such as TCP/IP stacks. Once transferred to protocol stacks 820, the data packets are transmitted to driver 824 through NDIS layer 828. Packets are output from driver 824 to network 832.

While certain exemplary embodiments have been described and shown in the accompanying drawings and description, it is to be understood that such embodiments are merely illustrative and not restrictive on the broad invention, and that this invention not be limited to the specific constructions and arrangements shown and described, since various other modifications may occur to those ordinarily skilled in the art.

What is claimed is:

1. A method for pacing packets of data being transmitted through a network comprising:

negotiating a bandwidth;

determining a transmission rate of packets corresponding to the negotiated bandwidth;

scheduling packet transmissions and adjusting a latency between packets to conform to the negotiated bandwidth;

interfacing a network interface card with a driver, the network to receive data from the network interface card;

communicating the driver with a network device interface standard protocol (NDIS), a protocol stack residing on a NDIS layer; and generating a socket to transmit data to the NDIS layer, the socket allowing use of various applications, wherein a control application schedules the packet transmissions and adjust the latency between packets by releasing pointers to the packets to the driver in a manner that the transmission rates of the packets corresponds to the negotiated bandwidth.

2. The method of claim 1 wherein the scheduling of packet transmissions includes measuring packet size to adjust the latency between packets.

3. The method of claim 1 further comprising:

monitoring recent transmissions to maintain an average data transfer rate within predetermined boundaries over a preset period of time.

4. The method of claim 1 wherein the negotiating is for inbound packet transmissions between a client and a server.

5. The method of claim 1 wherein the negotiating is for outbound packet transmissions between a client and a server.

6. The method of claim 1 wherein the socket is a Microsoft win-sock.

7. An apparatus to pace packets of data being transmitted through a network comprising:

a switch to control a flow of packet data through a switch;

a control application to adjust the latency of periods between packets to maintain an approximate rate of data flow through the switch, wherein said control application adjusts the latency period between packets by releasing pointers to the packets;

an interface card interfaced with a driver, the network to receive data from the network interface card;

a network device interface standard protocol (NDIS) to communicate with the driver, a protocol stack residing on a NDIS layer; and a socket to transmit data to the NDIS layer, the socket allowing use of various applications.

8. The apparatus of claim 7 wherein the switch couples a client to the network and the control application adjusts the rate of data flow from the network to the client.

9. The apparatus of claim 7 further comprising:

a multiplexer to couple a plurality of clients to the switch, the control application negotiating a bandwidth with each client of the plurality of clients and adjusting the latency of periods between packets to maintain a data flow within the negotiated bandwidth.

10. The apparatus of claim 7 wherein the control circuit is directed by software in a logical network driver at a NDIS level.

11. The apparatus of claim 10 wherein the control circuit stores packets for transfer in a queue, the control application confirms that a negotiated bandwidth will not be exceeded before releasing the pointer to a driver.

12. The apparatus of claim 7 wherein the socket is a Microsoft win-sock.

13. A computer program to pace packetized data transmitted between a client and a server, the computer program comprising:

a first code section to negotiate a bandwidth in one direction of data flow between the server and the client;

a second code section to schedule packet transmissions and adjust a latency between packets to conform to the negotiated bandwidth, wherein said second code section schedules the packet transmission and adjusts the latency between packets by systematically releasing pointers to the packets;

a third code section to interface a network interface card with a driver;

a fourth code section to communicate the driver with a network device interface standard protocol (NDIS), a protocol stack residing on a NDIS layer; and a fifth code section to generate a socket to transmit data to the NDIS layer, the socket allowing use of various applications.

14. The computer program of claim 13 further comprising:

a sixth code section to monitor packet size, information generated by the third code section processed by the second code section to adjust the latency between packets.

15. The computer program of claim 13 further comprising:

a sixth code section to monitor recent transmissions and to maintain an average data transfer rate within predetermined boundaries over a preset period of time.

16. The computer program of claim 15 wherein the first code section negotiates a bandwidth in a second direction.

17. The computer program of claim 13 wherein the socket is a Microsoft win-sock.

18. A system for pacing packets of data being transmitted through a network comprising:

a means for negotiating a bandwidth;

a means for determining a transmission rate of packets corresponding to the negotiated bandwidth;

a means for scheduling packet transmissions and adjusting a latency between packets to conform to the negotiated bandwidth, wherein said means for scheduling packet transmissions of packets and adjusting the latency between packets comprises a means for systematically releasing pointers to said packets;

a means for interfacing a network interface card with a driver, the network to receive data from the network interface card;

a means for communicating the driver with a network device interface standard protocol (NDIS), a protocol stack residing on a NDIS layer; and a means for generating a socket to transmit data to the NDIS layer, the socket allowing use of various applications.

19. The system of claim 18 wherein the scheduling of packet transmissions includes measuring packet size to adjust the latency between packets.

20. The system of claim 18 wherein the socket is a Microsoft win-sock.

* * * * *